United States Patent [19]
Newsom et al.

[11] 3,794,735
[45] Feb. 26, 1974

[54] EXTRACTION OF PROTEIN FROM SEED

[75] Inventors: Brian George Newsom, Pertenhall; Michael Peter Tombs, Pavenham, both of England

[73] Assignee: Lever Brothers Company, New York, N.Y.

[22] Filed: Sept. 16, 1971

[21] Appl. No.: 181,263

[30] Foreign Application Priority Data
Oct. 9, 1970  Great Britain .................. 48,072/70

[52] U.S. Cl............. 426/364, 260/123.5, 426/417, 426/431, 426/424
[51] Int. Cl. ........................ A23j 3/00, A23l 1/20
[58] Field of Search ................. 99/17, 14, 98, 20 E; 260/123.5, 412, 412.2, 412.3, 412.4

[56] References Cited
UNITED STATES PATENTS

| | | | |
|---|---|---|---|
| 3,090,779 | 5/1963 | Chayen | 260/412.3 X |
| 2,881,076 | 4/1959 | Sair | 99/17 |
| 3,468,669 | 9/1969 | Boyer et al. | 99/17 |
| 2,952,543 | 9/1960 | Szczesniak et al. | 99/14 |
| 2,928,821 | 3/1960 | Chayen | 260/112 |

*Primary Examiner*—A. Louis Monacell
*Assistant Examiner*—William Andrew Simons
*Attorney, Agent, or Firm*—Louis F. Kline, Jr. et al.

[57] ABSTRACT

A process of making foodstuffs (e.g., simulated meats) by the steps of mixing a coprecipitate of protein and lipid in the presence of water with an edible water-soluble salt, then heat-setting this mixture and, during or subsequent to setting, contacting the mixture with a lipid solvent.

6 Claims, No Drawings

EXTRACTION OF PROTEIN FROM SEED

This invention relates to the extraction of protein from protein-bearing seed.

Protein-bearing seed, for example soybeans and groundnuts, contains lipid and water-insoluble carbohydrate in addition to protein, and in extracting protein from the seed it is customary first to extract the lipid by treatment at low temperature with a lipid-solvent, such as hexane, and then to extract protein from the meal thus obtained. The resulting concentrate can be used in the manufacture of food products.

The present invention provides a process for the extraction of protein from protein-bearing seed which avoids the low-temperature extraction of seed with a lipid solvent, and yields a fluid lipid-containing protein material which can be used in the manufacture of food products.

In the first stage of the process of the invention, the seed is finely subdivided, and from the subdivided material an aqueous emulsion of protein and lipid is formed which contains in suspension the water-insoluble carbohydrate of the seed. In carrying out the first stage, the seeds are treated to split or remove the hulls and leave the cotyledons exposed, and these are finely subdivided in the presence of water, conveniently by passing them with water through a homogeniser equipped with cutters. Alternatively, whole (unhulled) seeds can be finely ground in the presence of water in a mill. Disintegration of the cotyledons releases powerful emulsifying agents naturally occurring in them, and under the action of these agents the protein and lipid of the seeds become emulsified.

It is desirable to include in the water employed a small proportion, suitably from 0.01 to 5 percent by weight, of a dissolved agent (such as a water-soluble, sulphite, bisulphite or dithionite) that prevents the linking of protein - SH groups to form intermolecular-S-S-linkages. By this means one can prevent the aggregation of protein molecules that tends to occur in aqueous protein systems and often results in gelation.

The aqueous emulsion of protein and lipid formed by the above procedure is then treated to remove from it the water-insoluble carbohydrate that it contains in suspension. This is best done by centrifugation.

The supernatant protein-lipid emulsion is then acidified to reduce its pH to a value at which the protein becomes precipitated. The pH chosen will be in the vicinity of the isoelectric pH of the protein component of the emulsion; with soy protein, for example, the pH of the emulsion is reduced to a value in the range 4.2 – 5.5. The use of hydrochloric or sulphuric acid as precipitant is preferred. The protein component of the emulsion is not precipitated alone, but brings down with it a fairly high proportion of the lipid component; that is to say, a coprecipitate of protein and lipid is formed. This precipitated material is separated from the supernatant liquid, suitably by centrifugation, and is obtained in the form of a 'cake,' usually of solids content in the range 30 – 60 percent by weight.

The separated coprecipitate of protein and lipid is then mixed with an edible salt; this, when used in at least the minimum proportion defined in the next paragraph, has the effect of converting the solid protein present in the coprecipitate into a fluid aqueous preparation of protein concentration at least 15 percent by weight and usually in the range 15 – 50 percent. This fluid aqueous preparation is rather viscous and contains distributed in it the lipid present in the coprecipitate, and it can be utilised in the manufacture of food products.

The edible salt employed is preferably sodium chloride, but other edible salts can be used if desired, for example sodium phosphate, potassium chloride and calcium chloride. The salt is used in an amount such that the fluid aqueous preparation that is formed from it and from the separated coprecipitate and associated water contains dissolved edible salt in a concentration equivalent to an ionic strength of at least 0.2. The ionic strength is calculated from the ion concentrations and the water content of the fluid aqueous preparation, in accordance with the well-known equation $$\text{Ionic strength} = \tfrac{1}{2}\Sigma C_i Z_i^2$$

where
$C_i$ = molar concentration of each ion
$Z_i$ = valence of each ion

Thus, for a fluid aqueous preparation containing 27½ percent protein, 15 percent lipid, 5 percent other organic material (such as water-soluble carbohydrate), 2 percent sodium chloride, ½ percent calcium chloride, and 50 percent water, the ionic strength based on the water content is $$\tfrac{1}{2} (0.68 \times 1^2 + 0.68 \times 1^2 + 0.09 \times 2^2 + 0.18 \times 1^2) = 0.95$$

To utilise the fluid lipid-containing aqueous protein preparation in the manufacture of food products, it is subjected to conditions under which it becomes solidified or 'set' owing to setting of the protein content. Setting is preferably brought about by heat. The product obtained by solidifying the preparation will usually have a pronounced flavor of the seed from which it is derived (for example, flavor of soy bean), and such a product is accordingly best made use of in dishes (such as curries) which have a flavor of their own pronounced enough to mask the seed flavor. However, we have found that if the preparation is during or subsequent to solidification exposed to a lipid-solvent so that part of the lipid content is dissolved and the protein/lipid ratio correspondingly increased, then the 'seed flavor' is markedly reduced; the utility of the product is then correspondingly widened. The preferred procedure consists in extruding the fluid aqueous preparation into a setting medium maintained at a temperature of at least 75°C. If a lipid-solvent is used as setting medium, the setting of the protein and dissolution of the lipid are substantially simultaneous. The lipid solvent employed may, for example, be isopropanol or isopropanol-water mixtures. If the setting medium used is not a lipid solvent, then the extruded set material can be treated with a lipid-solvent to reduce its lipid content. By extruding through spinnerets of small diameter, fibers can be obtained, and these can be used as an ingredient of manufactured food products, especially as part-replacement for meat.

The following Examples further illustrate the invention as applied to soybeans.

Example 1

This Example, and Example 2, illustrate the treatment of soybeans to obtain a fluid aqueous protein preparation containing lipid.

Dehulled soy beans (250g) were passed with aqueous 0.1 percent sodium sulphite (2.5 litres) through a homogeniser fitted with blades, and the aqueous emulsion of protein and lipid thus formed was centrifuged at 500 × g for 30 minutes to remove suspended water-insoluble carbohydrate. The pH of the supernatant emulsion was then reduced by addition of an acid reagent to a value in the range 5.5 – 4.2, and the coprecipitate of protein and lipid thus obtained was centrifuged at 500 × g for 30 minutes. The moist separated precipitate (cake) of protein and lipid was analysed, with the results shown below:

| Acid reagent | % Yield: solids in cake/ solids in bean | Composition of cake | | |
|---|---|---|---|---|
| | | Solids % | Protein % | Lipid % |
| a. HCl | 38 | 37.1 | 21.8 | 9.5 |
| b. H₂SO₄ | 38 | 37.7 | 22.8 | 9.0 |
| c. HCl+0.1M CaCl₂ | 38 | 42.1 | 24.8 | 11.4 |

To the cake there was added 4 percent by weight of solid sodium chloride, and the mixture was stirred to form a viscous aqueous preparation containing dissolved protein, dissolved salt and lipid as follows:

| Aqueous preparation | % protein by weight of preparation | % lipid by weight of preparation | ionic strength of preparation |
|---|---|---|---|
| derived from cake a | 21.0 | 9.1 | 1.09 |
| derived from cake b | 21.9 | 8.7 | 1.10 |
| derived from cake c | 23.8 | 11.0 | 1.18 |

Example 2

Unhulled soy beans (20 kg) were mixed with aqueous 0.1 percent sodium sulphite solution (200 litres) and milled in a Hobart MCV12 mill, so as to pass a 0.2 mm gap. The aqueous protein-lipid emulsion formed was passed twice through a supercentrifuge to remove water-insoluble carbohydrate, and was then acidified to pH 4.9 with hydrochloric acid. The resulting coprecipitate of protein and lipid was centrifuged off, and the separated cake (53.7 percent solids content) was analysed and found to contain 28.7 percent protein and 19.6 percent lipid.

Four percent by weight of solid sodium chloride was mixed with the cake, and a viscous aqueous prepration formed containing 20.9 percent protein and 14.4 percent lipid, and having an ionic strength of 1.16.

Example 3

This Example, and Example 4, illustrate setting treatments of a fluid aqueous protein-lipid preparation such as is obtained by the procedures of Examples 1 and 2.

A preparation obtained following generally the procedure of Example 2 and of the composition:

| Water | Solids | Protein | Lipid | Ash |
|---|---|---|---|---|
| 65.4 | 34.6 | 20.7 | 7.1 | 3.6% | was filtered through a 100 mesh (BSS) sieve to remove traces of solid carbohydrate and was extruded through spinnerets of diameter 0.2 mm into a setting bath maintained at 75° – 80°C. In four separate procedures, the setting baths and the composition:

i. isopropanol
ii. 75% isopropanol, 25% water
iii. 50% isopropanol, 50% water
iv. 25% isopropanol, 75% water The composition of the fibres produced is shown below, and compared with that of the aqueous preparation from which they were obtained by extrusion.

COMPOSITION OF FIBRES

| | Water | Total solids | Protein | Lipid | Ash | Protein/ lipid (%) |
|---|---|---|---|---|---|---|
| Fibres i | 29.7 | 70.3 | 41.3 | 11.1 | 6.4 | 3.64 |
| Fibres ii | 53.5 | 46.5 | 31.5 | 8.9 | 1.7 | 3.54 |
| Fibres iii | 55.3 | 44.7 | 31.2 | 8.8 | 0.9 | 3.54 |
| Fibres iv | 56.0 | 44.0 | 31.2 | 9.6 | 0.5 | 3.24 |

The fibres obtained as described above can be used as a foodstuff, for example as part-replacement for the meat ordinarily used in the preparation of beefburgers or canned reformed meat. The flavour of soybean in material thus made is only slight, and hardly detectable at all with use of the fibres made in setting bath i).

Example 4

A fluid aqueous protein preparation obtained following generally the procedure of Example 2 was filtered and then extruded through spinnerets of 0.2 mm diameter into water at 90°C. The fibres thus formed (4 kg) were treated with hexane in an extractor of the soxhlet type for 3 hours, using a 15 minute cycle. The residual solvent was removed from the fibres by treating them with live steam for 3 hours. The changes in composition that occurred in the conversion of the fluid aqueous protein preparation to the final fibre product are shown below:

| Material | Water % | Lipid % | Protein % | Ash % |
|---|---|---|---|---|
| Fluid preparation | 56 | 16.2 | 23.1 | 2.8 |
| Fibres | 57.6 | 16.9 | 23.4 | 0.6 |
| Solvent-extracted fibres | 52.2 | 16.8 | 27.6 | 0.5 |

Substitution of groundnuts (peanuts) for the soybeans of the above examples gives essentially similar results.

What is claimed is:

1. In a process for the manufacture of a foodstuff from protein-bearing seed which additionally contains lipid and water-insoluble carbohydrate, said process comprising finely subdividing the seed in the presence of water to form an aqueous protein-lipid emulsion containing the water-insoluble carbohydrate in suspension; separating said water-insoluble carbohydrate from the emulsion; acidifying the emulsion to form a coprecipitate of protein and lipid; and separating the coprecipitate from supernatant liquid; the improvement which consists in carrying out the steps of:
   i. mixing the separated coprecipitate of protein and lipid in the presence of water with an edible water-soluble salt in an amount effective to form a fluid aqueous protein-lipid-salt preparation in which the lipid present in said coprecipitate is distributed and which contains protein in a concentration of at least 15 percent by weight; and ii. setting the fluid aqueous protein-lipid-salt preparation by heat; and iii. during or subsequent to setting, contacting the protein-lipid-salt preparation with a lipid solvent, whereby part of the lipid content is dissolved and the protein/lipid ratio of the preparation is increased.

2. A process according to claim 1, wherein said fluid aqueous protein-lipid-salt preparation is set by extrusion into a setting medium maintained at a temperature of at least 75°C.

3. A process according to claim 2, wherein the setting medium is a lipid-solvent which comprises isopropanol.

4. A process according to claim 2, wherein the setting medium is a liquid in which the lipid is insoluble, and the extruded set material formed by extrusion into said liquid is subsequently treated with a lipid solvent.

5. A process according to claim 1, wherein said edible water-soluble salt is sodium chloride.

6. A process according to claim 1, wherein the seeds employed are soybeans.

* * * * *